UNITED STATES PATENT OFFICE.

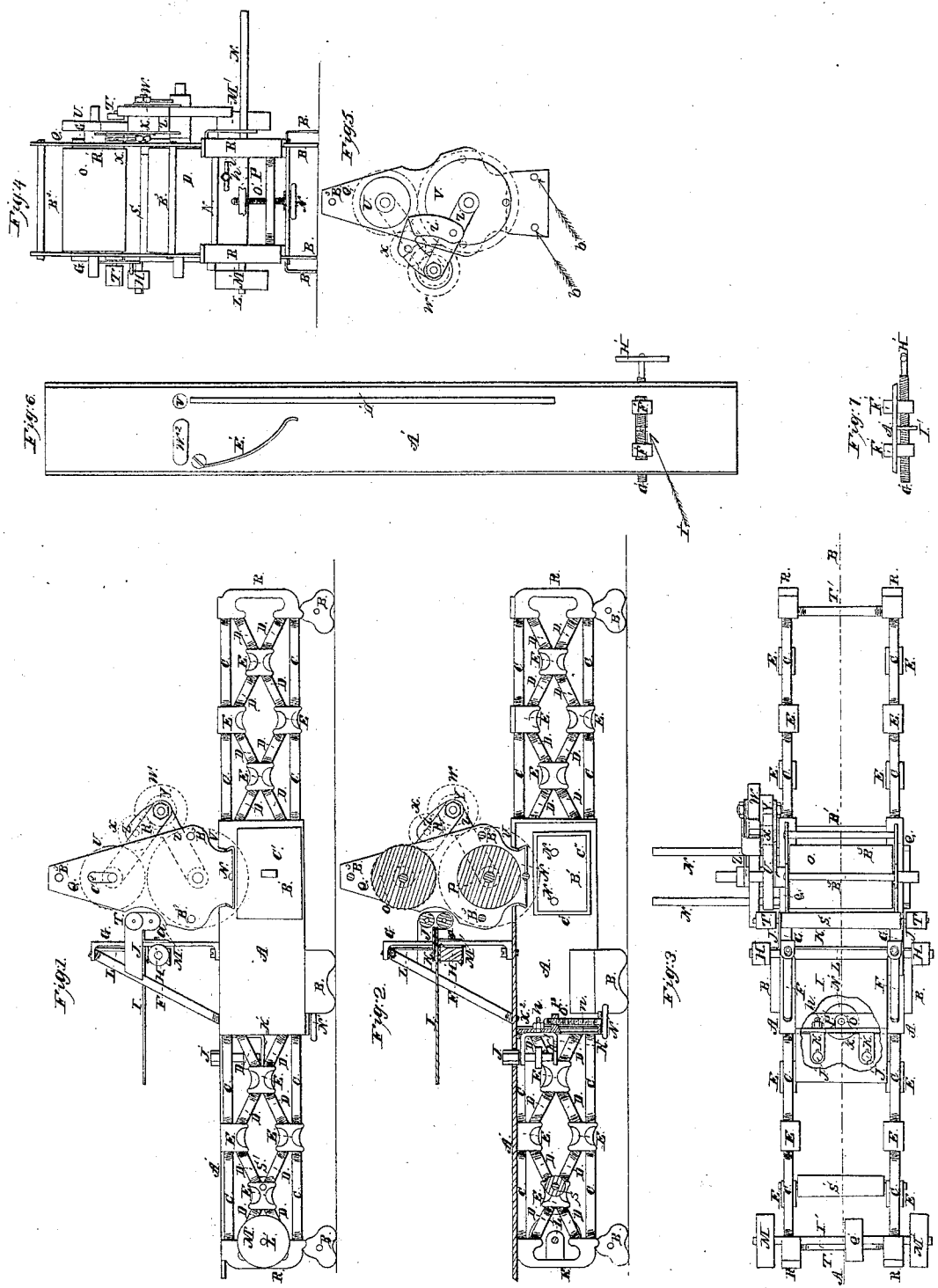
H. D. Storer,
Planing and Matching Machine.
N° 32,904. Patented July 23, 1861.

HENRY D. STOVER, OF NEW YORK, N. Y.

PLANING-MACHINE.

Specification of Letters Patent No. 32,904, dated July 23, 1861.

*To all whom it may concern:*

Be it known that I, HENRY D. STOVER, of the city, county, and State of New York, have invented a new and useful Planing, Surfacing, and Matching Machine; and I hereby declare that the following specification, in connection with the accompanying drawings and letters of reference marked thereon, constitutes a lucid, clear, and exact description of the construction and use of the same.

In referring to the said drawings, Figure 1, denotes a side elevation. Fig. 2, a longitudinal vertical, and central section on line A, B, Fig. 3. Fig. 3, is a plan or top view of my machine except the platen which is removed. Fig. 4, is a front end view of the same. Fig. 5, an opposite end view of the feed rolls from that shown in Fig. 1, and the arrangement for driving and adjusting them. Fig. 6, is a plan or top view of the movable platen for carrying the lumber and Fig. 7, denotes an end elevation of the same.

*Invention:* The nature of my invention consists in constructing the bed pieces of planing or other machines in short sections to be readily united together for constructing the bed piece or structure, and also for lengthening the structure or for detachment to shorten the same to any required degree, so that the same may occupy, usually, but little room when used for ordinary work, and be readily extended for any desired length to be planed or matched. Also in constructing the central portion of the bed piece of cast iron, and extending the same lengthwise by hollow tubing or rods so threaded and connected to the central portion as to be extended or diminished in length by connected couplings or their equivalents at pleasure and the ways or tracks for the platen to be adjusted or brought to a line by turning these screws or threaded tubes or rods. Also in providing the movable platen with securing clamps operated by right and left hand screws or equivalent means, between which clamps the pieces to be dressed are readily, easily, and firmly secured upon the platen without being clamped or twisted, so that the planing cutters may dress the piece straight and out of wind. Also in the arrangement of matching cutters to be adjustable both laterally with each other and vertically upon the bed piece essentially, as described, in combination with the platen, so that the planing and matching of the piece may both proceed at the same time or either the planing or matching may be done separately or the platen made movable with the piece thereupon secured to be finished or matched or both finished and matched. Also in gearing the feed rolls to each other by the gears so arranged and suspended upon swinging arms that the centers or axis of all the gears meshing together are constantly retained at the same distance from each other, and in such manner that the drive and driven gear attached to the feed rolls are so kept connected that the teeth of the gears remain properly meshed so as to operate freely at whatever elevation the upper feed roll may be from the lower one. And in so arranging the cutting cylinder and combining it with a stationary table and a platen which may be used stationarily or movably that the lower portion of cylinder may be dressing a board or piece while at the same time the upper, or other portion of the cylinder, may dress another piece, and thus increase the capacity of the machine by feeding the material to the cutters at different points of the periphery of the cutting cylinder at the same time. Also, in sliding the feed rolls into and out of position to connect them for use with the bed piece and cutting cylinder and removal therefrom by means of rods or their equivalents arranged to receive and carry the roll frame or otherwise combining the rolls, movable platen, and cutting cylinder so that either the rolls, or platen, may feed the material to the cutters. Also, in the arrangement of pressure plate and table with each other, as to allow the boards, even if very thin, to be fed and pressed between them firmly upon the top surface of table, in combination with planing cylinder, the cutting blades of which protrude upward through this table, sufficient to dress the lower face of the board or piece. Also in constructing the uprights which carry the cutting cylinder of a frontal plate, the lower end of which is directly secured to the bed piece, and the upper end secured by a tube, or rod consisting of a brace so threaded to the frontal plate and the bed piece that by turning this screw the face of the upright may be firmly positioned perpendicularly, or at any angle required, all as will be herein seen.

*Construction:* To enable persons skilled in the art to which my invention appertains to construct and carry out the same I will describe it as follows:

I construct the central portion of bed piece by casting it in one entire piece seen at A. having a safe chamber, or tool holder, formed therein when and at the same time it is cast as seen at B' or it may be made separately from the bed piece and afterward placed therein and secured, the same being made of two or more partitions, seen at C'', the space between being filled with any good nonconducting substance, or the tool holder may be made in one thickness if preferred, and formed in any part of the machine. The central portion is extended by adding sections or lengths in front, and back, so constructed as to be quickly and firmly attached in sufficient numbers to form the desired length of the bed whether for temporary or permanent use, and to be readily detached when it is desired to shorten the bed piece. I will now describe the method which I have adopted for carrying out this part of my invention. I drill and tap or thread the central portion A. so as to receive the tubes or rods D. properly threaded thereto and to the couplings E and end pieces R. each tube or rod is to be threaded a right hand screw on one of its ends, and a left hand thread on its other end so that by simply turning these screws the sections of the bed piece are connected together, and also tightened, and brought to a line. Bars seen at T' hold the sections together by being properly threaded thereto, the whole bed piece being supported on legs seen at B. Thus any number of sections may be added to or removed readily from the central piece A. as will readily be seen in the drawings for any desired length: producing a frame at little expense which is very durable and strong.

The platen is constructed as seen at A', its edges $e$. being so shaped and fitted as to slide freely but singly in grooves $c$. formed in couplings E which constitute a portion of the bed piece. To the platen A'. is secured a guide D'. which may be removed at pleasure. This correctly guides the board in connection with spring E' to be matched by cutters which may be raised up through holes $V^2$ and $W^2$ formed through the platen for that purpose, and adjusted at the desired elevation they being driven by pulley S' from pully Q' on drive shaft L'. The platen may thus be used stationary and over which the board may be moved by feed rolls to be both planed and matched on both edges at the same time, or either may in the same manner be done separately, or the platen may be moved by any means (not necessary to be shown) and the lumber secured thereupon while lying perfectly natural; by jaws F' operated by right and left hand screws G' to pinch and hold the piece by turning the lever H'. This screw is supported at its center by stand I' and any desired number of sets of these jaws may be attached to the platen for the desired purpose.

The matching cutters and arbors, seen at J' are suspended so as to freely revolve in stands K' which are attached adjustably and pivoted to bar $X^2$ by bolts $h$, and mortise $i'$ so as to be laterally adjusted and retained at the required distance from each other; to match both edges of the board, and to be canted or set and secured angularly, if desired, by means of the bolts $h$. The matching cutters and bar $X^2$ are made vertically movable and adjustable by sliding in grooves $n$, which are formed in central portion of bed piece A. by means of screw $o'$ threaded and fitted to stand P' on bar $X^2$ and turned by wheel N'.

I construct the upright as follows: The frontal plate G has its lower end bolted to the central portion A. of the bed piece. I then construct a tube or rod F and cut a right hand screw thread upon one end and a left hand screw thread upon the other end, and then correspondingly thread it, to the top of part A. and to the top of frontal piece G so that by turning this rod or tube, the frontal piece will be set to the desired angle and there firmly held and braced.

The planing cylinder is seen at H and suspended to freely revolve in journal boxes secured to frontal pieces G and also above the cylinder I secure a table I' movably and adjustably by stands M and srew, A. A mortise is formed through this table sufficiently large to allow, the cutting blades to pass through and dress the under face of the board which rests and is fed along upon the table I' by rolls S suspended in stands J and driven by belts around pulley T or otherwise: to be planed. The piece or board being kept down close to the table by spring plate K and spring L during the operation this device is particularly adapted to dress very thin pieces. Thus a board or piece may be dressed by the cylinder by being fed along over it and another board or piece dressed at the same time by being passed under this same cutting cylinder by platen or feed rolls thus performing double the work of any planing machine heretofore known.

It will be understood that dimension lumber and surface lumber can both be dressed on my machine at the same time, or separately if desired, and in order to dress dimension lumber the platen is moved in bed along with the piece secured upon it to be dressed and when boards are to be dressed by passing them under the cutting cylinder, requires that a set, or pair of feed rolls shall be combined with the other portions of my machine to feed the boards or pieces over the platen A. and under the cutters to be dressed: the platen being fixed during such operation. These feed rolls O and P are suspended to turn in a frame consisting of stands or side plates Q which are connected together by rods B³, the rolls and their frame being moved into and out of position on rods which are secured to the bed piece as seen in the drawing. Slots seen at C³ are formed through the plates Q to allow the top feed roll to rise and fall to accommodate itself to various thicknesses of material.

The feed rolls are so geared together in the peculiar manner, hereafter described, that whenever and however the top feed roll be positioned by the thickness of the lumber the gears will be self adapting to always mesh with each other freely and effectively as follows: I fix the drive gear V upon the shaft of the lower feed roll P and the driven gear U upon the shaft of the upper feed roll O an arm seen at Z is placed and pivoted to lower feed roll shaft on either side of gear V the out end of this stand Z carries the gear W with which the gear V meshes freely and always uniform. This arm Z also carries gear Y which is secured beside and to gear W. To the out end of arm Z is pivoted the lower end of arm R' and its upper end pivoted to and turned upon, upper feed roll shaft. To the stand Z I secure a secondary stand, seen at Z' to be made adjustable or to swing and to be set upon stand Z so as to bring the gear X to the proper mesh with gears U and W and so retain them at whatever distance the feed rolls may be apart.

I claim—

1. Constructing the bed piece in sections of tubes or solid pieces to be lengthened or shortened conveniently in order that a bed piece usually employed for dressing short pieces and occupying but little room may be quickly lengthened and adapted to dress long pieces also.

2. Providing the movable platen with securing clamps operated substantially as herein described between which the piece to be dressed whether warped or twisted is readily and easily secured to the platen and firmly held without bending out the warps or twist and without the necessity of blocking up so that the cutters will dress the piece straight and out of wind as set forth.

3. The arrangement of matching cutters to be adjusted both laterally with each other and vertically upon the bed piece essentially as described in combination with the platen, so that the planing and matching of the piece may both proceed at the same time, or either the planing or matching may be done separately whether the platen be made movable with the piece secured thereupon or the platen be fixed and the piece be made to move thereon.

4. The arrangement of the gearing for driving the feeding rolls so that cog wheels of greater diameter than the rollers can be mounted on their shafts and at the same time admit of adjusting the distance between the two rollers to suit any varying thickness of lumber to be planed, which arrangement consists in placing the two wheels on the shafts of the rollers in two separate and parallel planes so that one will pass by the other, in combination with the elbow frame in which the shaft of the connecting pinions is mounted and the series of radial moving arms by which the shafts of the said wheels are connected with their pinions and the two sets of pinions with each other, substantially as and for the purpose specified.

5. So arranging the cutting cylinder that its lower portion may be dressing a board or piece and at the same time the upper or other portion of the cylinder may dress another piece substantially as described in combination with feed rolls and movable platen for feeding the material to the cylinder at different points of its periphery substantially as set forth.

6. Sliding the feed rolls into and out of position to connect them for use with the fixed bed piece and cutting cylinder and remove them when the movable bed is used by means of the cross-ways substantially as described.

7. The pressure plate above the cylinder and the table below between which the board or lumber, even if exceedingly thin, may be fed to the planing cylinder in combination with the planing cylinder for the purpose and in the manner substantially as set forth.

8. The manner of connecting the uprights of the frontal plate with the bed piece in combination with the diagonal tubes or rods F which are threaded to the uprights with right hand screws and also threaded by left hand screws to the bed piece substantially as described so that by turning the screws the face of the upright may be adjusted in position substantially as described.

9. In combination with the frame work of a planing or other machine, a safe or other suitable case for the preservation or safe keeping of the tools and other valuable appurtenances belonging to the machines, as described.

HENRY D. STOVER.

Witnesses:
 GEO. W. LORD,
 ARAD WOODWORTH.